United States Patent [19]

Suzuki et al.

[11] Patent Number: 5,074,463
[45] Date of Patent: Dec. 24, 1991

[54] AIR CONDITIONING APPARATUS FOR AUTOMOTIVE VEHICLE

[75] Inventors: Hiroyuki Suzuki, Fujisawa; Koetsu Takehana, Atsugi; Ikutaro Noji, Yokohama, all of Japan

[73] Assignee: Nissan Motor Co., Ltd., Yokohama, Japan

[21] Appl. No.: 592,927

[22] Filed: Oct. 4, 1990

[30] Foreign Application Priority Data

Oct. 27, 1989 [JP] Japan .................................. 1-280152

[51] Int. Cl.$^5$ ........................... F24F 7/00; B60H 1/32
[52] U.S. Cl. ............................ 236/49.3; 236/DIG. 9; 165/42; 62/244; 454/75; 454/145; 454/160
[58] Field of Search ........................ 236/49.3, DIG. 9; 165/16, 42, 43; 98/2.01; 62/186, 244, 239, 161, 163, 164, 296

[56] References Cited

U.S. PATENT DOCUMENTS

| | | | |
|---|---|---|---|
| 4,358,050 | 11/1982 | Naganoma et al. | 165/42 X |
| 4,408,713 | 10/1983 | Iijima et al. | 236/DIG. 9 |
| 4,498,309 | 2/1985 | Kobayashi et al. | 236/49.3 X |
| 4,518,032 | 5/1985 | Funasaki et al. | 236/49.3 X |

Primary Examiner—Harry B. Tanner
Attorney, Agent, or Firm—Foley & Lardner

[57] ABSTRACT

To reduce air suction noise in internal air recirculation mode of an air conditioner for an automotive vehicle, a difference in temperature between a target value and an actual value is calculated and the amount of blown air is decreased in the internal air recirculation mode, as compared with that in the external air introduction mode, by reducing a voltage applied to a blower fan motor, only when the calculated temperature difference is a predetermined value or less.

4 Claims, 3 Drawing Sheets

AIR CONDITIONING APPARATUS FOR AUTOMOTIVE VEHICLE

BACKGROUND OF THE INVENTION

1. Field of the Invention

The present invention relates to an air conditioning apparatus for an automotive vehicle, and more specifically to an air conditioning apparatus which can automatically control the amount of air blown by a blower fan.

2. Description of the Prior Art

In conventional air conditioning apparatus for an automotive vehicle, a room temperature sensor is provided for detecting temperature within a vehicle room; a difference between the detected room temperature and a target temperature (preset by a temperature setting switch provided within the vehicle room) is calculated; and the amount of air blown by a flower fan is automatically controlled on the basis of the difference in temperature between the two.

On the other hand, in the conventional air conditioning apparatus for an automotive vehicle, in general an external air introduction mode and an internal air recirculation mode can be selected according to the situation. In the external air introduction mode, air outside the vehicle is introduced by a flower fan into the vehicle room through a cowl box. In the internal air recirculation mode, air within the vehicle room is sucked by the flower fan and then blown again into the vehicle room. In the prior-art air conditioning apparatus, however, there exists a problem in that air suction noise in the internal air recirculation mode is higher than that in the external air introduction mode under the condition that the same amount of air is blown into the vehicle room through the blower fan. The reason is as follows: although the air suction noise is produced in both the external air introduction mode and the internal air recirculation mode whenever the blower fan is being rotated, since air is introduced from the outside in the case of the external air introduction mode, the air suction noise is reduced passing through some elements such as instrument panel, etc. before reaching the driver's ears. In contrast with this, since air is directly introduced from under the instrument panel in the case of the internal air recirculation mode, the air suction noise is not reduced by any other elements and directly reaches the driver's ears. The air suction noise increases with increasing amount of air blown by the blower fan.

In the prior-art air conditioning apparatus, however, since the amount of air introduced into the vehicle room by the blower fan is controlled in the same way in both the external air introduction mode and the internal air recirculation mode, there exists a problem in that the air suction noise by the blower fan increases abruptly whenever the external air introduction mode is switched to the internal air recirculation mode, thus allowing the driver and the passengers to feel unpleasant.

SUMMARY OF THE INVENTION

With these problems in mind therefore, it is the primary object of the present invention to provide an air conditioning apparatus for an automotive vehicle which can reduce air suction noise in the internal air recirculation mode, in particular.

To achieve the above-mentioned object, the air conditioning apparatus for an automotive vehicle, according to the present invention, comprises: (a) air blowing means (102) for blowing cooled or warmed air into a vehicle room; (b) internal/external mode selecting means (112) for selecting any one of internal air recirculation mode and external air introduction mode; (c) intake door means (104) responsive to said mode selecting means, for recirculating internal air in the vehicle room when said mode selecting means selects the internal air recirculation mode and introducing external air into the vehicle room when said mode selecting means selects the external air introduction mode; (d) temperature setting means (111) for setting a target room temperature; (e) temperature detecting means (121) for detecting actual room temperature; (f) calculating means (101A) responsive to said temperature setting means and said temperature detecting means; for calculating difference in temperature between the actual room temperature and the target room temperature; (g) air amount control means (101B) responsive to said internal/external mode selecting means and said calculating means, for controlling the amount of air blown by said air blowing means on the basis of temperature difference calculated by said calculating means in such a manner that the amount of blown air in the internal air recirculation mode becomes smaller than that in the external air introduction mode with respect to the same calculated temperature difference.

Further, the method of controlling the amount of cooled or warmed air blown into a vehicle room by a blower fan motor, according to the present invention, comprises: (a) setting a target room temperature To; (b) detecting an actual room temperature T; (c) calculating a difference $\Delta T$ in temperature between the two (T−To); (d) if the calculated temperature difference $|\Delta T|$ is larger than a predetermined value $\Delta To$, controlling voltage applied to the blower fan motor to a high voltage to increase the amount of blown air; (e) if the calculated temperature difference $|\Delta T|$ is the predetermined value or less, checking whether air conditioning mode is external air introduction mode or internal air recirculation mode; and (f) controlling the voltage applied to the blower fan motor on the basis of the calculated temperature difference in such a manner that the amount of blown air in the internal air recirculation mode is reduced to reduce air suction noise, as compared with that in the external air introduction mode.

In the air conditioning apparatus for an automotive vehicle according to the present invention, since the voltage applied to the blower fan motor can be reduced to decrease the amount of blown air in the internal air recirculation mode as compared with that in the external air introduction mode, in particular when temperature difference between the target value and the actual value is a predetermined value or less, it is possible to effectively reduce the air suction noise in the internal air recirculation mode, without deteriorating the practical cooling or warming performance of the air conditioning apparatus.

DETAILED DESCRIPTION OF THE PREFERRED EMBODIMENTS

Embodiments of the air conditioning apparatus according to the present invention will be described hereinbelow with reference to the attached drawings.

Figure 1:
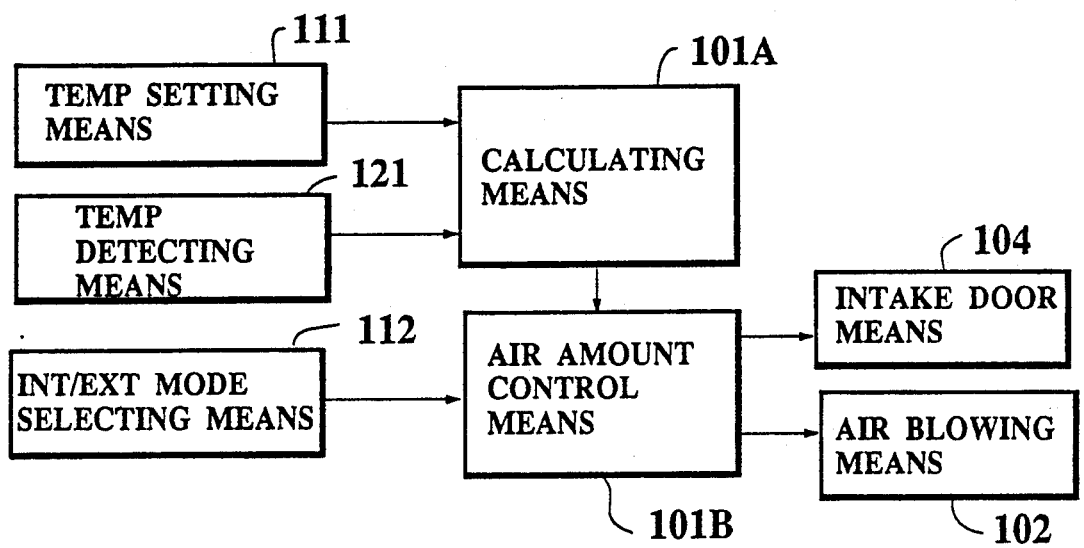
FIG. 1 is a conceptional block diagram showing the air conditioning apparatus for an automotive vehicle according to the present invention.

In FIG. 1, the air conditioning apparatus of the present invention comprises air blowing means 102 for blowing cooled or warmed air into a vehicle room; internal/external mode selecting means 112 for selecting any one of internal air recirculation mode such that internal air is recirculated within the vehicle room by the air blowing means 102 and external air introduction mode such that external air is introduced into the vehicle room by the air blowing means 102; intake door means 104 for switching air passage, according to the air internal/external mode, to circulate internal air in the vehicle room when the mode selecting means 112 selects the internal air recirculation mode and to introduce external air into the vehicle room when the mode selecting means selects the external air introduction mode; temperature setting means 111 for setting a target room temperature; temperature detecting means 121 for detecting actual room temperature; calculating means 101A for calculating difference between the actual room temperature and the target room temperature; and air amount control means 101B for controlling the amount of air blown by the air blowing means on the basis of temperature difference calculated by the calculating means. Further, the feature of the air conditioning apparatus according to the present invention is to control the voltage to actuate the air blowing means 102 in such a way that the amount of air blown by the flower fan motor in the internal air recirculation mode is reduced, as compared with that in the external air introduction mode, under the same temperature difference condition, in order that the air suction noise by the blower fan can be reduced, in particular in the internal air recirculation mode.

Figure 2:
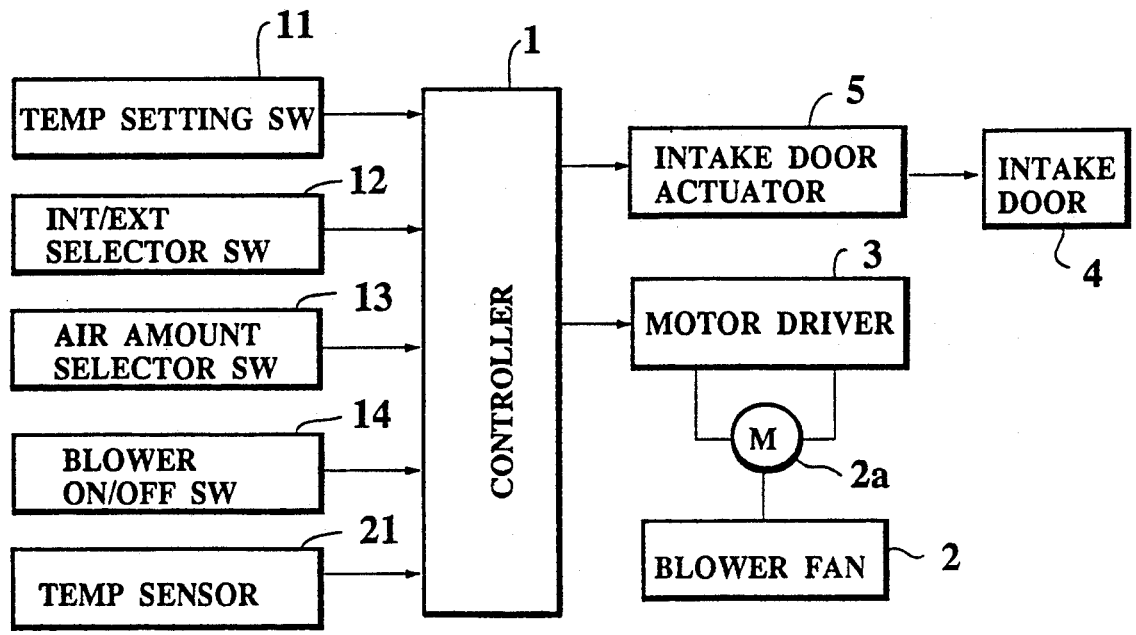
FIG. 2 is a more practical block diagram showing an embodiment of the air conditioning apparatus according to the present invention.

FIG. 2 shows a more practical block diagram of the air conditioning apparatus according to the present invention. The apparatus shown in FIG. 2 comprises a controller ($\mu$P) 1, a blower fan 2, a blower fan motor 2a, a fan motor driver 3, an intake door 4, an intake door actuator 5, a target temperature setting switch 11, an internal/external mode selector switch 12, a manual air amount selector switch 13, a blower fan motor on/off switch 14 and a vehicle room temperature sensor 21. The intake door 4 is pivoted by the intake door actuator 5 to an external air introduce position at which external air can be introduced by the blower fan 2 into the vehicle room through a cowl box or to an internal air recircle position at which internal air can be recircled by the same blower fan 2 in the vehicle room. In this embodiment, the amount of air blown by the blower fan 2 is controlled by voltage applied to the motor 2a, because the speed of the motor 2a can be adjusted according to the voltage applied thereto.

The target temperature setting switch 11 is used to set any desired target room temperature To. The internal/external mode selector switch 12 is used to select any one of the internal air recirculation mode and the external air introduction mode. The air amount selector switch 13 is used to select any one of 1st (low) motor speed (the small amount of air), 2nd (medium) motor speed (the medium amount of air) and 3rd (high) motor speed (the large amount of speed. The fan motor on/off switch 14 is used to activate (turn on) or deactivate (turn off) the blower fan motor 2a. The room temperature sensor 21 detects room temperature T. The above switches 11, 12, 13 and 14 are all arranged within the vehicle room and near the driver.

Further, the temperature setting means 111 corresponds to the temperature setting switch 11; the room temperature detecting means 121 corresponds to the temperature sensor 21, the internal/external mode selecting means 112 corresponds to the internal/external selector switch 12; the calculating means 101A and the air amount control means 101B correspond to the controller 1; the intake door means 104 corresponds to the intake door 4 and the intake door actuator 5; and the air blowing means 102 corresponds to the blower fan 2, the blower fan motor 21, and the motor driver 3.

Figure 3:
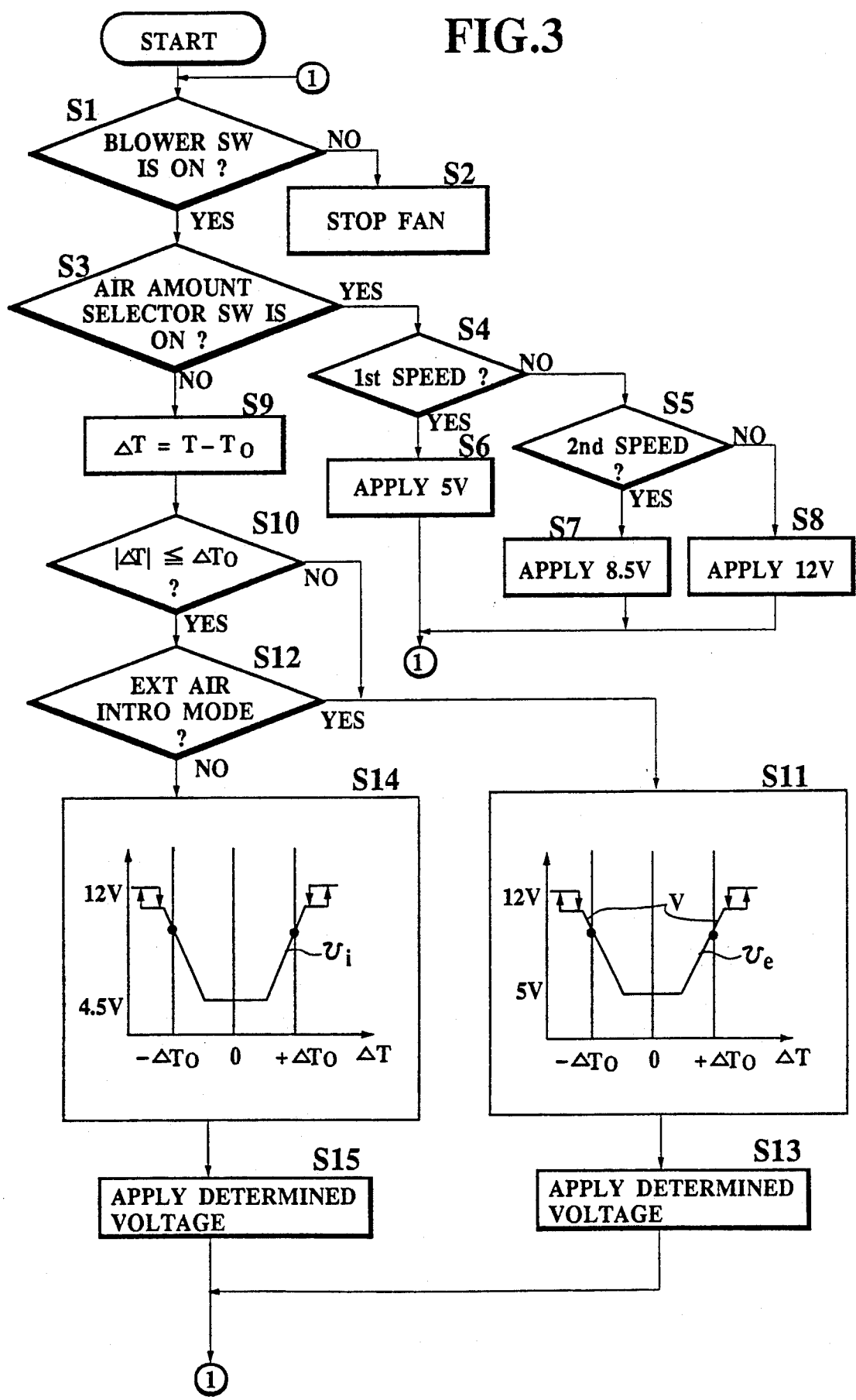
FIG. 3 is a flowchart for assistance in explaining the control procedure of the apparatus according to the present invention.

The operation of the air conditioning apparatus will be explained in more detail with reference to a flowchart shown in FIG. 3.

Control first checks whether the blower fan motor on/off switch 14 is turned on (in step S1). If NO, control stops the blower fan motor 2a (in step S2). If YES, control checks whether the air mount selector switch 13 is on (in step S3). If YES, control proceeds to step S4 to check whether the air amount selector switch 13 is set to 1st speed (in step S4). If YES, control applies a low voltage (e.g. 5 V) to the blower fan motor 2a via the motor driver 3 (in step S6). If NO (in step S4), control checks whether the air amount selector switch 13 is set to 2nd speed (in step S5). If YES control applies a medium voltage (e.g. 8.5 V) to the blower fan motor 2a via the motor driver 3 (in step S7). If NO (in step S5), control determines that 3rd speed is set and applies a voltage (e.g. 12 V) to the blower fan motor 2a via the motor driver 3 (in step S8). The higher the voltage applied to the blower fan motor 2a is, the higher will be the motor speed and therefore the more will be the amount of air to be introduced into the cowl box. After each blower fan motor driving voltage has been applied to the motor 2a, control returns to step S1.

As explained above, when the air amount selector switch 13 has been selected, the amount of air supplied by the blow fan is determined according to the position (1st, 2nd or 3rd) of the manual selector switch 13.

When the air amount selector switch 13 is not operated (in step S1), control proceeds to the succeeding step to calculate $\Delta T = T - To$ (in step S9), where T denotes the actual room temperature detected by the room temperature sensor 21; To denotes the target temperature set by the temperature setting switch 11; and $\Delta T$ denotes the difference between the two. Thereafter, control checks whether the absolute value $|\Delta T|$ of the calculated temperature difference is equal or less than a predetermined value $\Delta To$ (in step S10). If NO; that is, if $|\Delta T| > \Delta To$, control proceeds to the succeeding step to determine a voltage to be applied to the blower fan motor 2a on the basis of the calculated temperature difference $\Delta T$ in accordance with the characteristics V, irrespective of the internal air recirculation mode or the external air introduction mode (in step S11). The determined voltage is applied to the motor 2a (in step S13). Therefore, the amount of air fed by the blower fan 2 is increased according to the relatively higher motor voltage.

On the other hand, if YES; that is, if $|\Delta T| \leq \Delta To$ (in step S10), control checks whether the internal/external selector switch 12 is set to the external air introduction mode or not (the internal air recirculation mode) (in step S12). If YES (the external air introduction mode), control proceeds to the succeeding step to determine a voltage to be applied to the blower fan motor 2a on the basis of the calculated temperature difference $\Delta T$ in accordance with the characteristics $V_e$ (in step S11). The determined voltage is applied to the blower fan motor 2a (n step S13). If NO (the internal air recirculation mode) (in step S12), control proceeds to the succeeding step to determine a voltage to be applied to the blower fan motor 2a on the basis of the calculated temperature difference $\Delta T$ in accordance with the characteristics $V_i$ (in step S14). The determined voltage is applied to the blower fan motor 2a (in step S15).

As described above, only when the manual air amount selector switch 13 is not operated or set and further the detected temperature difference $\Delta T$ lies within a range between $-\Delta To$ and $+\Delta To$, the voltage applied to the blower fan motor 2a in the external air introduction mode is different from that in the internal air recirculation mode. That is, the motor voltage is determined in accordance with the characteristics $V_e$ in the external air introduction mode and $V_i$ in the internal air introduction mode.

Figure 4:
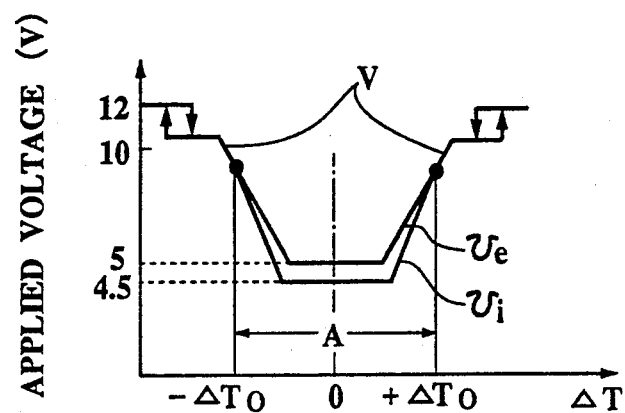
FIG. 4 is a graphical representation showing the relationship between the voltage to be applied to the blower fan motor and the difference in temperature between the actual value and the target value.

FIG. 4 shows, the two characteristics $V_e$ and $V_i$ superposed upon each other. FIG. 4 indicates that the voltage $V_i$ applied to the blower fan motor 2a in the internal air recirculation mode is determined lower than that $V_e$ in the external air introduction mode when the temperature difference $\Delta T$ between the two (T−To) lies within the range from $-\Delta To$ to $+\Delta To$, so that the amount of air fed by the blower fan 2 in the internal air recirculation mode becomes smaller than that in the external air introduction mode.

In the present invention, it should be noted that when the temperature difference $\Delta T$ is out of the range A (FIG. 4), since the room temperature T is much different from the target value To, the voltage applied to the motor 2a is kept at the same higher level in both the external air recirculation mode and the internal air recirculation mode, so that the cooling and warming performance has a priority over the noise reduction.

However, only when the temperature difference $\Delta T$ is smaller than the predetermined value $\Delta To$, the voltage applied to the motor 2a is different between the two modes. This is because, when the temperature difference $\Delta T$ is small and therefore lies within the range A, since the room temperature T is close to the target temperature To, it is possible to keep the room temperature T close at the target value To even if the quantity of air in the internal air recirculation mode is reduced to some extent as compared with that in the external air introduction mode.

As described above, in the air conditioning apparatus according to the present invention, it is possible to reduce air suction noise in the noisy internal air recirculation mode, without deteriorating the cooling or warming performance of the apparatus. Therefore, it is possible to prevent the driver or the passenger from feeling unpleasant due to noise generated high in the internal air recirculation mode.

Figure 5:
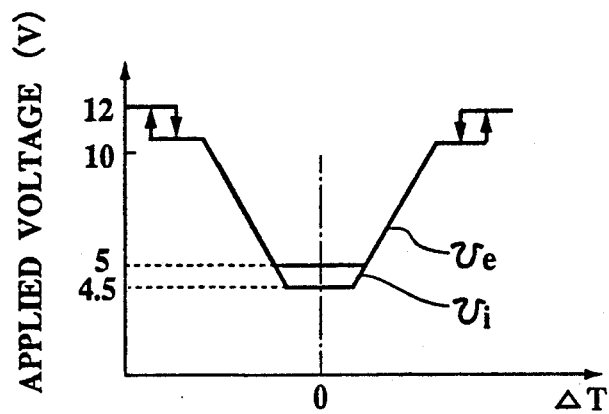
FIG. 5 is another graphical representation showing a modification similar to the relationship shown in FIG. 4.

The characteristics $V_e$ and $V_i$ of the motor voltage with respect to the temperature difference are not limited to only those shown in FIG. 4. For instance, FIG. 5 shows another example of the characteristics $V_e$ and $V_i$, in which the motor voltage $V_i$ in the internal air recirculation mode is determined lower only within a smaller temperature difference range. Further, it is also possible to reduce the amount of air in the internal air recirculation mode all over the temperature difference range A.

Further, in the above embodiment, the amount of air fed by the blow fan is determined only on the basis of the temperature difference between the actual room temperature T and the target room temperature To. However, it is also preferable to determine the blower fan motor voltage under consideration of the external air temperature, the intensity of solar radiation, etc. in addition to the temperature difference between the actual and target values. Further, the apparatus of the present invention can be applied to the apparatus for determining the amount of air fed by the blower fan on the basis of the target air mix door open rate calculated on the basis of the temperature difference between the two (T−To), external air temperature, the intensity of solar radiation, etc. in addition to the temperature difference between the two (T−To).

As described above, in the air conditioning apparatus for an automotive vehicle according to the present invention, since the amount of air fed by the blower fan in the internal air recirculation mode can be reduced, as compared with that in the external air introduction mode, under the same temperature difference condition, it is possible to reduce air suction noise produced in the internal air recirculation mode for prevention of the driver or the passengers from feeling unpleasant due to air suction noise, without deteriorating air conditioning performance.

What is claimed is:

1. An air conditioning apparatus for an automotive vehicle, comprising:
   (a) air blowing means for blowing cooled or warmed air into a vehicle room;
   (b) internal/external mode selecting means for selecting any one of internal air recirculation mode and external air introduction mode;
   (c) intake door means responsive to said mode selecting means, for recirculating internal air in the vehicle room when said mode selecting means selects the internal air recirculation mode and introducing external air into the vehicle room when said mode selecting means selects the external air introduction mode;
   (d) temperature setting means for setting a target room temperature;
   (e) temperature detecting means for detecting actual room temperature;
   (f) calculating means responsive to said temperature setting means and said temperature detecting means; for calculating difference in temperature between the actual room temperature and the target room temperature; and
   (g) air amount control means responsive to said internal/external mode selecting means and said calculating means, for controlling the amount of air blown by said air blowing means on the basis of temperature difference calculated by said calculating means in such a manner that the amount of blown air in the internal air recirculation mode becomes smaller than that in the external air introduction mode with respect to the same calculated temperature difference.

2. The air conditioning apparatus for an automotive of claim 1, wherein the amount of blown air in the internal air recirculation mode is determined smaller than that in the external air introduction mode only when the calculated absolute temperature difference is a predetermined value or less.

3. A method of controlling the amount of cooled or warmed air blown into a vehicle room by a blower fan motor, comprising the steps of:

(a) setting a target room temperature To;
 (b) detecting an actual room temperature T;
 (c) calculating a difference $\Delta T$ in temperature between the two (T−To);
 (d) if the calculated temperature difference $|\Delta T|$ is larger than a predetermined value $\Delta To$, controlling voltage applied to the blower fan motor to a high voltage to increase the amount of blown air;
 (e) if the calculated temperature difference $|\Delta T|$ is the predetermined value or less, checking whether air conditioning mode is external air introduction mode or internal air recirculation mode; and
 (f) controlling the voltage applied to the blower fan motor on the basis of the calculated temperature difference in such a manner that the amount of blown air in the internal air recirculation mode is reduced to reduce air suction noise, as compared with that in the external air introduction mode.

4. A method of controlling the amount of cooled or warmed air blown into a vehicle room by a blower fan motor, comprising the steps of:

(a) setting a target air temperature To;
 (b) detecting an actual air temperature T;
 (c) calculating a difference $\Delta T$ in temperature between the target temperature and the actual temperature;
 (d) determining whether the calculated temperature difference $\Delta T$ is smaller than a predetermined value $\Delta To$ and producing a first signal indicative thereof;
 (e) determining whether or not internal air introduction mode is selected and producing a second signal indicative thereof;
 (f) determining whether or not the first signal and the second signal are concurrently produced and producing a third signal indicative thereof; and
 (g) decreasing the amount of blown air in response to the third signal.

* * * * *

UNITED STATES PATENT AND TRADEMARK OFFICE
CERTIFICATE OF CORRECTION

PATENT NO. : 5,074,463
DATED : Dec. 24, 1991
INVENTOR(S) : SUZUKI et al.

It is certified that error appears in the above-identified patent and that said Letters Patent is hereby corrected as shown below: Title page, item [75] "Inventors:" Hiroyuki SUZUKI's residence address should read -- Tokyo, Japan --

Signed and Sealed this

Fifth Day of April, 1994

Attest:

BRUCE LEHMAN

*Attesting Officer*  *Commissioner of Patents and Trademarks*